US012519350B2

United States Patent
Mandel et al.

(10) Patent No.: US 12,519,350 B2
(45) Date of Patent: *Jan. 6, 2026

(54) SYSTEM, METHOD AND APPARATUS FOR COOLING PCB STATOR

(71) Applicants: INFINITUM ELECTRIC, INC., Round Rock, TX (US); UNIVERSITY OF MARYLAND, COLLEGE PARK, College Park, MD (US)

(72) Inventors: Raphael Kahat Mandel, College Park, MD (US); Paulo Guedes-Pinto, Round Rock, TX (US); Amir Shooshtari, College Park, MD (US); Randal A. Lee, Austin, TX (US)

(73) Assignees: INFINITUM ELECTRIC INC., Austin, TX (US); UNIVERSITY OF MARYLAND, COLLEGE PARK, College Park, MD (US)

( * ) Notice: Subject to any disclaimer, the term of this patent is extended or adjusted under 35 U.S.C. 154(b) by 267 days.

This patent is subject to a terminal disclaimer.

(21) Appl. No.: 18/272,160

(22) PCT Filed: Jan. 19, 2022

(86) PCT No.: PCT/US2022/012920
§ 371 (c)(1),
(2) Date: Jul. 13, 2023

(87) PCT Pub. No.: WO2022/159451
PCT Pub. Date: Jul. 28, 2022

(65) Prior Publication Data
US 2024/0072591 A1  Feb. 29, 2024

Related U.S. Application Data

(60) Provisional application No. 63/140,471, filed on Jan. 22, 2021.

(51) Int. Cl.
*H02K 1/20* (2006.01)
*H02K 1/16* (2006.01)
(Continued)

(52) U.S. Cl.
CPC ............... *H02K 1/20* (2013.01); *H02K 1/165* (2013.01); *H02K 1/276* (2013.01); *H02K 1/32* (2013.01);
(Continued)

(58) Field of Classification Search
CPC .......... H02K 1/20; H02K 1/165; H02K 1/276; H02K 1/32; H02K 3/24; H02K 3/26;
(Continued)

(56) References Cited

U.S. PATENT DOCUMENTS

| 4,115,915 A | 9/1978 | Godfrey |
| 5,675,206 A | 10/1997 | Horski |

(Continued)

FOREIGN PATENT DOCUMENTS

EP   2863524   4/2015

OTHER PUBLICATIONS

Notification of Transmittal of the International Search Report and the Written Opinion of the International Searching Authority, or the Declaration dated Apr. 18, 2022 (Apr. 18, 2022), 9 pages, issued on the related international patent application PCT/US2022/012920 by the International Search Authority.

*Primary Examiner* — Ahmed Elnakib
(74) *Attorney, Agent, or Firm* — Dickinson Wright PLLC

(57) ABSTRACT

An axial field rotary energy device can include a housing and a rotor rotatably coupled to the housing. The rotor can have an axis of rotation and magnets. A stator assembly can be coupled to the housing coaxial with and adjacent to the rotor. The stator assembly can include a printed circuit board (Continued)

(PCB) having electrically conductive coils and an internal air duct for cooling the stator assembly.

26 Claims, 10 Drawing Sheets

(51) Int. Cl.
  *H02K 1/276* (2022.01)
  *H02K 1/32* (2006.01)
  *H02K 3/24* (2006.01)
  *H02K 3/26* (2006.01)
  *H02K 9/06* (2006.01)
  *H02K 11/00* (2016.01)

(52) U.S. Cl.
  CPC ............... *H02K 3/24* (2013.01); *H02K 3/26* (2013.01); *H02K 9/06* (2013.01); *H02K 11/0094* (2013.01); *H02K 2201/03* (2013.01); *H02K 2203/03* (2013.01); *H02K 2213/03* (2013.01)

(58) Field of Classification Search
  CPC .. H02K 9/06; H02K 11/0094; H02K 2201/03; H02K 2203/03; H02K 2213/03; H02K 2211/03; H02K 11/33; H02K 11/30
  See application file for complete search history.

(56) References Cited

U.S. PATENT DOCUMENTS

| | | | |
|---|---|---|---|
| 6,351,044 B1 | 2/2002 | Miyahara | |
| 2023/0352995 A1* | 11/2023 | Mandel | H02K 9/06 |
| 2024/0072591 A1* | 2/2024 | Mandel | H02K 3/26 |

\* cited by examiner $\Delta T_{max} \approx 220°C$
$R_{th} = 0.025$ K/W
$m_{air} = 0.11$ kg/s
$\Delta P = 1800$ Pa
COP = 50

SYSTEM, METHOD AND APPARATUS FOR COOLING PCB STATOR

CROSS REFERENCE TO RELATED APPLICATIONS

This application is a U.S. National Phase patent application of and claims priority to and the benefit of PCT/US2022/012920, filed Jan. 19, 2022, which claims priority to and the benefit of U.S. Provisional Application Patent Ser. No. 63/140,471, filed Jan. 22, 2021, titled "System, Method and Apparatus for Cooling PCB Stator". The entire disclosures of the above-referenced applications are hereby incorporated by reference.

TECHNICAL FIELD

This application generally relates to ventilation and cooling of electrical devices and, in particular, to a system, method and apparatus for cooling a PCB stator in an electrical motor or generator.

BACKGROUND

Some axial flux electric machines, such as motors or generators, use printed circuit board (PCB) stators. Examples include U.S. Pat. Nos. 10,141,803, 10,135,310, 10,340,760, 10,141,804, 10,186,922 and 11,177,726, each of which is incorporated herein by reference in its entirety. These machines can include one, two or more PCB stators, such as one for each electrical phase of the machine. Some machines may include a PCB stator having windings for more than one phase.

Each PCB stator can include a plurality of coils formed, for example, in a copper laminated structure of the PCB. The coils can include multiple turns depending on the design of the stator. FIG. 1 depicts an example of a 3-turn coil 101 in a PCB stator having a circular disk shape. Each turn can include, for example, two 'straight' sections 103 of conductors that are substantially radially oriented with respect to the central axis of the circular disk PCB. Versions of the straight sections 103 can be connected by arches 105 or arch segments, which can be substantially circumferentially or tangentially oriented relative to the central axis of the circular disk PCB.

The coil depicted in FIG. 1 may have multiple layers connected by blind or buried vias. FIG. 2 shows a partial cross section of an embodiment of a PCB stator 200 where four coils 101 in four PCB layers are electrically connected in parallel with a blind via 201. Coils can be connected in any number in parallel, series or combinations thereof.

Many other coil shapes are possible, such as rhomboidal coils, parallel track coils and combination parallel and radial coils are just a few options.

As the machine is powered, electrical currents circulate through the coils. The circulation of currents through the PCB stator coils produces resistive losses, and the interaction between those currents and external magnetic fields, and magnetic fields produced by the currents themselves, produce eddy current losses. The combination of the resistive and eddy currents losses generate heat in the PCB stator. This is an undesired effect of the circulation of currents in the PCB stator, as it increases the temperature of the stator. In extreme cases, the temperature rise of the PCB stator may exceed the temperature class of the laminate used in the PCB stator, leading to its premature failure. Thus, it is desirable to remove heat from the PCB stator to keep its temperature below the temperature class of the PCB laminate material.

As shown in FIG. 3, the mechanisms for removing heat from the PCB stator 200 can include conduction 301, convection 303 and radiation heat transfer. Some of the heat generated in the coil conductors is carried by conduction to the external surfaces of the PCB stator where it can be removed by an air flow generated by a fan or blower. Other portions of the heat generated by the coil conductors can be carried by conduction along the layers of the PCB toward the area where the PCB is coupled to the machine housing 305 with a fastener 307 such as a screw, clamp or combinations thereof. Heat can continue to be conducted through the housing toward cooler surfaces and volumes as illustrated in FIG. 3, for example.

This heat removal mechanism can be hindered by the generally poor thermal conductivity of the PCB laminate material, which is typically around 0.3 W/mK perpendicular to the PCB plane, and about 0.9 W/mK in the PCB plane. If the surface temperature of the PCB is greater than the surrounding surfaces, some of heat generated in the PCB can be radiated to the surrounding surfaces. The net radiation heat transfer can be expressed by the following Stefan-Boltzmann Law $q = \varepsilon \sigma (T_h^4 - T_c^4) A$, where q is the heat transfer, $\varepsilon$ is the emissivity coefficient of the PCB, $\sigma$ is the Stefan-Boltzmann constant, $T_h$ is temperature of the PCB, and $T_c$ is the temperature of the surrounding surfaces and A is the area of the PCB.

The heat removal through convection is limited to the two, substantially flat surfaces of the PCB. This heat transfer process can be enhanced if additional surfaces are made available for cooling.

SUMMARY

Embodiments of a system, method and apparatus for cooling a PCB stator in an electrical motor or generator are disclosed. For example, an axial field rotary energy device can include a housing and a rotor rotatably coupled to the housing. The rotor can have an axis of rotation and magnets. A stator assembly can be coupled to the housing coaxial with and adjacent to the rotor. The stator assembly can include a printed circuit board (PCB) having electrically conductive coils and an internal air duct for cooling the stator assembly.

DETAILED DESCRIPTION

The embodiments of FIGS. 4-17, as described herein, can incorporate internal air ducts and other features to the PCB to enhance the heat removal process through convection and lower the overall rise in temperature of the PCB during operation.

Figure 1:
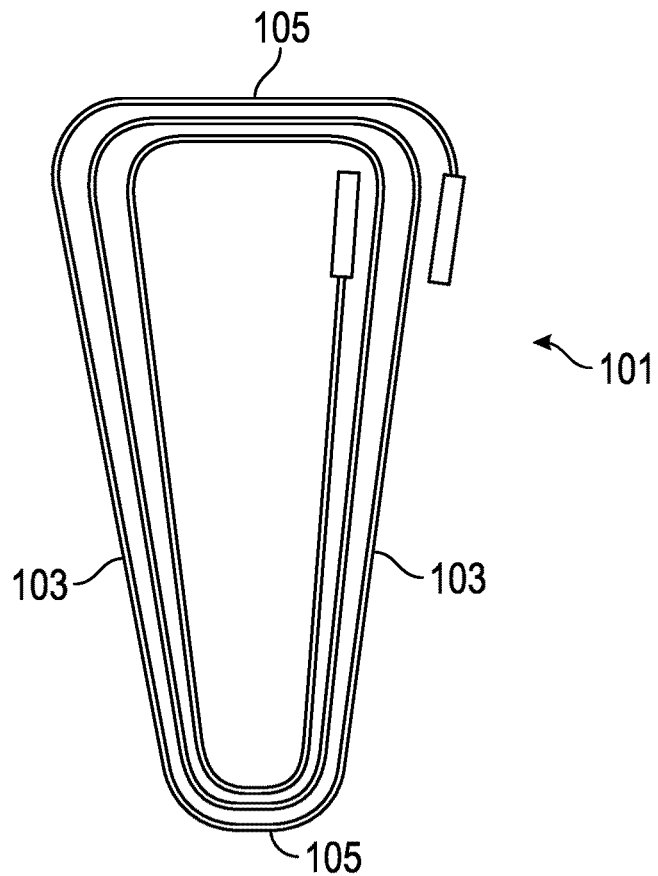
FIG. 1 is a plan view of a conventional PCB stator coil.
Figure 2:
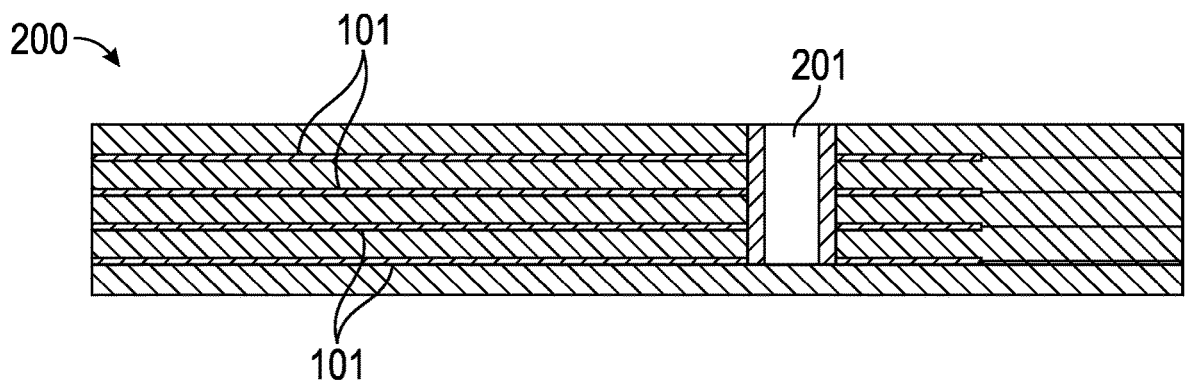
FIG. 2 is a sectional radial view of a portion of a conventional PCB stator having four coils connected in parallel with a blind via.
Figure 3:
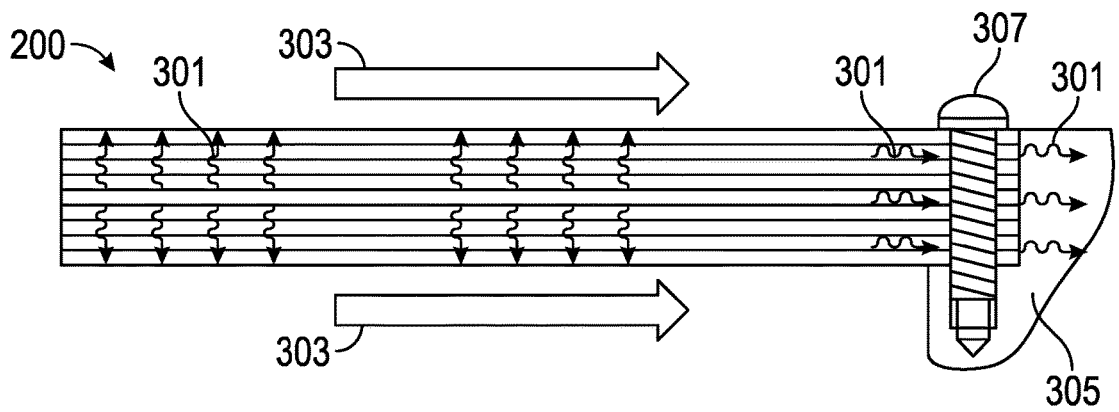
FIG. 3 is a sectional radial view of a portion of a conventional PCB stator mounted to a housing, illustrating typical heat removal techniques.
Figure 4:
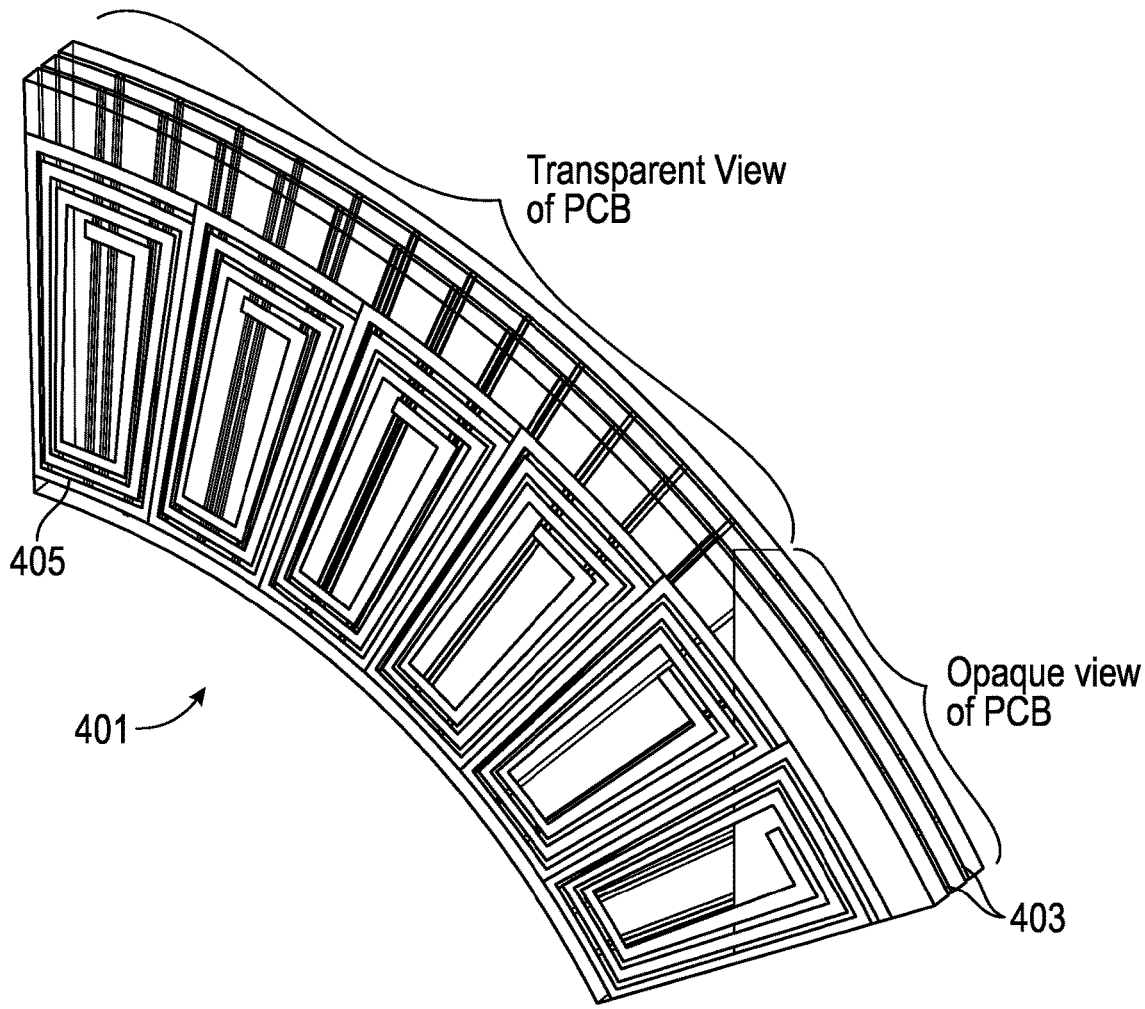
FIG. 4 is a partial isometric view of an embodiment of a PCB stator with internal air ducts showing, on the left, a transparent view of the PCB and, on the right, an opaque view of the PCB.

By adding air ducts into the body of the PCB, a low heat resistance path can be formed to facilitate convective heat flow from the PCB to the cooling air. FIG. 4 shows a section of an embodiment of a PCB stator 401 with two air ducts 403 built into the PCB structure to facilitate air flow through the PCB, while adding additional heat exchange surfaces that facilitate heat transfer through convection.

For ease of understanding, FIG. 4 shows, on the left, a transparent view of the PCB and, on the right, an opaque view of the PCB. The embodiment of FIG. 4 can comprise a stack of individual PCBs that are joined (e.g., bonded) together. Collectively, the stack of PCBs can comprise a single, monolithic structure having each PCB layer operate or function as a PCB section. Each PCB can have one or more arrays of co-planar coils 405, and the arrays of coils 405 can form axial and symmetrical arrays of coils, or be axially and symmetrically stacked in the PCB. The internal air ducts 403 can be located between adjacent ones of the PCBs, in some versions.

Figure 5:
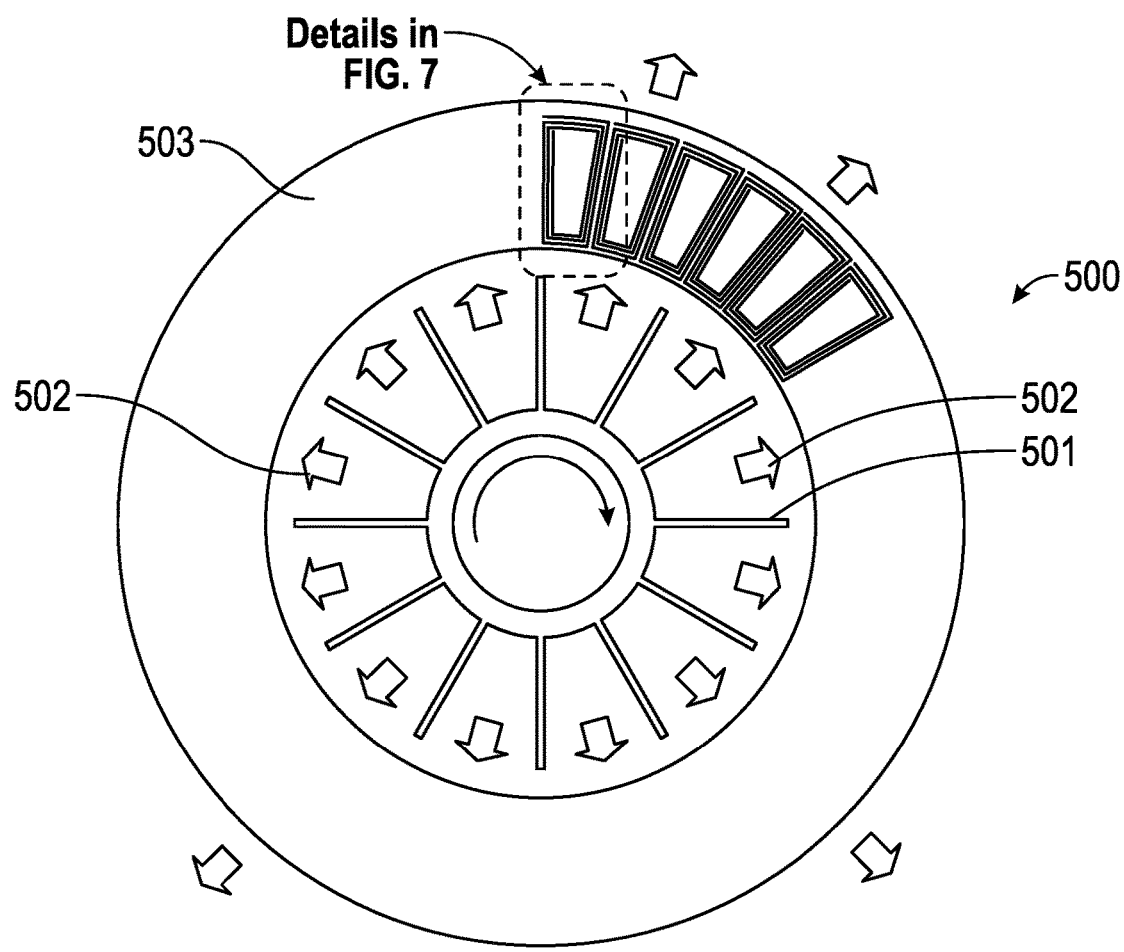
FIG. 5 is a schematic plan view of an embodiment of a PCB with an example of an air flow system.
Figure 6:
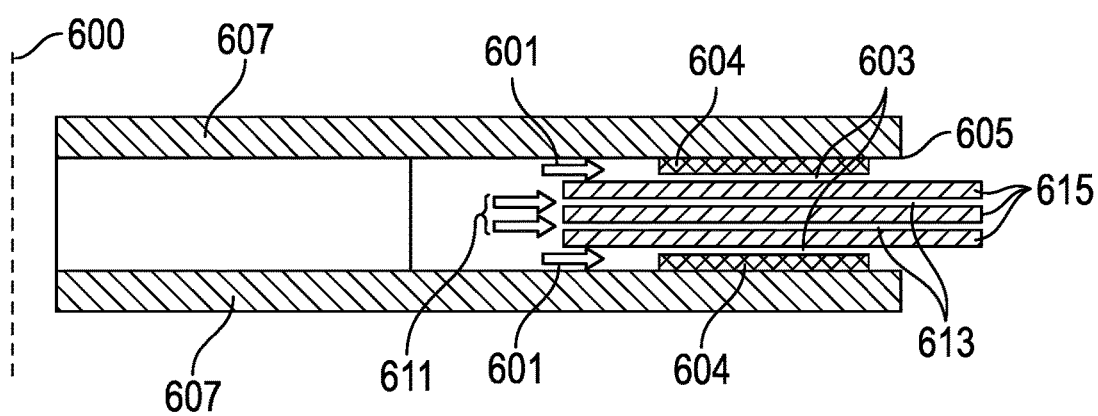
FIG. 6 is a sectional radial view of an embodiment of a device and depicts air flow through and around a PCB stator.
Figure 7:
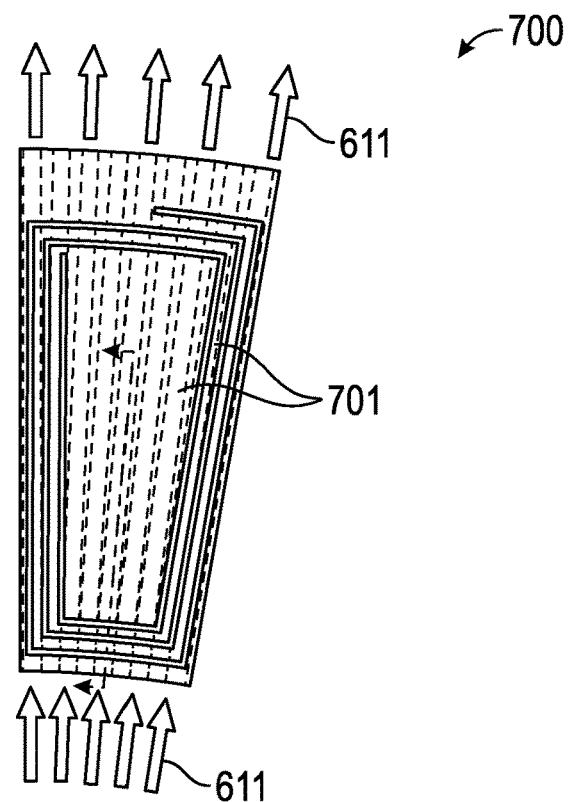
FIG. 7 is an enlarged, schematic plan view of a portion of an embodiment of a PCB stator of FIG. 5, shown with air ducts and airflow in the system.

FIGS. 5-7 show additional details of an embodiment of the duct structures and the air flow through them. In the embodiment depicted in FIG. 5, an internal fan 501 can be coupled to the rotor discs of the axial flux machine 500 and can produce a substantially radial airflow 502 (see large arrows) to flow through and cool the PCB stator 503.

FIG. 6 shows an example of FIG. 5 where the radial air flow, relative to axis of rotation 600, can be split into a first airflow 601 that can flow outwardly through the machine air gap 603 adjacent the magnets 604, and exit at the periphery 605 of the rotor 607. A second radial airflow 611 can flow radially through the ducts 613 located inside the PCB stator 615 and can exit at the outer edge of the PCB stator 615.

FIG. 7 depicts a portion of a version of the PCB stator 700 that shows radial air ducts 701 located inside the PCB stator 700, and an example of the general orientation of the second airflow 611 depicted in FIG. 6.

The embodiments depicted in FIGS. 4-7 show a PCB stator built as a single, monolithic structure encompassing a plurality of coils and sections. In other embodiments, however, the PCB stator can be segmented in a plurality of semi-circular segments, as depicted in FIG. 8.

Figure 8:
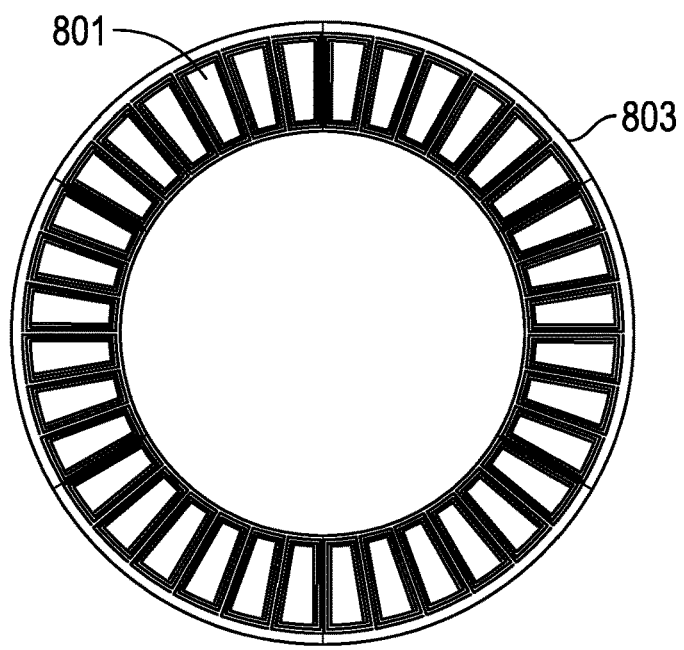
FIG. 8 is a plan view of an embodiment of a PCB stator having six PCB segments.

The PCB stator 801 embodiment depicted in FIG. 8 has six segments 803, each with approximately 60 degrees of angular span. Other embodiments, however, can have any number of segments 803. In addition, although FIG. 8 shows an embodiment where the segments 803 have the same angular span, other embodiments can have segments 803 with different angular spans, such as three segments with 60 degrees of angular span and two segments with 90 degrees of angular span. Still other combinations of numbers of segments and angular spans can be used.

In a segmented PCB stator embodiment, such as the one shown in FIG. 8, each PCB section of each PCB stator segment 803 can, for example, be connected to an electrical phase. The segment sections can be circumferentially shifted relative to each other angularly by 360/n electrical degrees, where n is the number of electrical phases.

The embodiments depicted in FIGS. 4 and 6 can include a PCB stator with three PCB sections. Those three PCB sections are shown with substantially the same axial thickness and are separated by two interleaved sets of air ducts (i.e., one air duct between each adjacent pair of PCB sections) having substantially the same axial thickness. However, other embodiments can have only two PCB sections with one air duct between them, or four PCB sections interleaved with three air ducts. More generally, embodiments can have any arrangement of N stator sections with N−1 air ducts.

Figure 9:
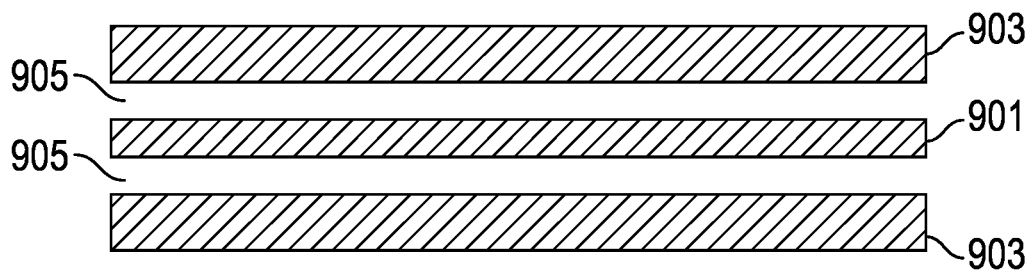
FIG. 9 is a schematic, sectional radial view of an embodiment of a PCB stator with PCB sections of different axial thicknesses.
Figure 10:
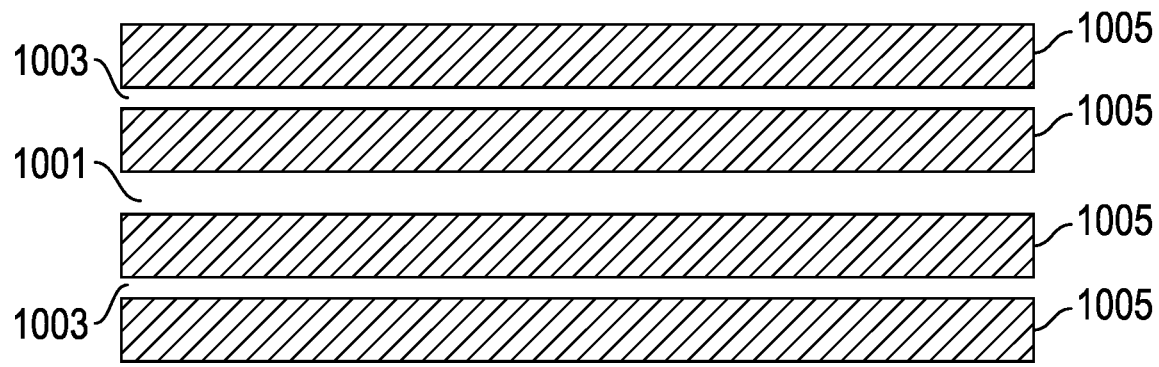
FIG. 10 is a schematic, sectional radial view of an embodiment of a PCB stator with air ducts of different axial thicknesses.

The axial thicknesses of the PCB stator sections also can differ from one PCB section to another PCB section. For example, FIG. 9 shows an embodiment of a PCB stator with three PCB sections, where the inner PCB section 901 is axially thinner than the other two outer PCB sections 903. Other embodiments can have air ducts with different axial thicknesses as shown in FIG. 10, including a wide air duct 1001 and narrower air ducts 1003.

Figure 11:
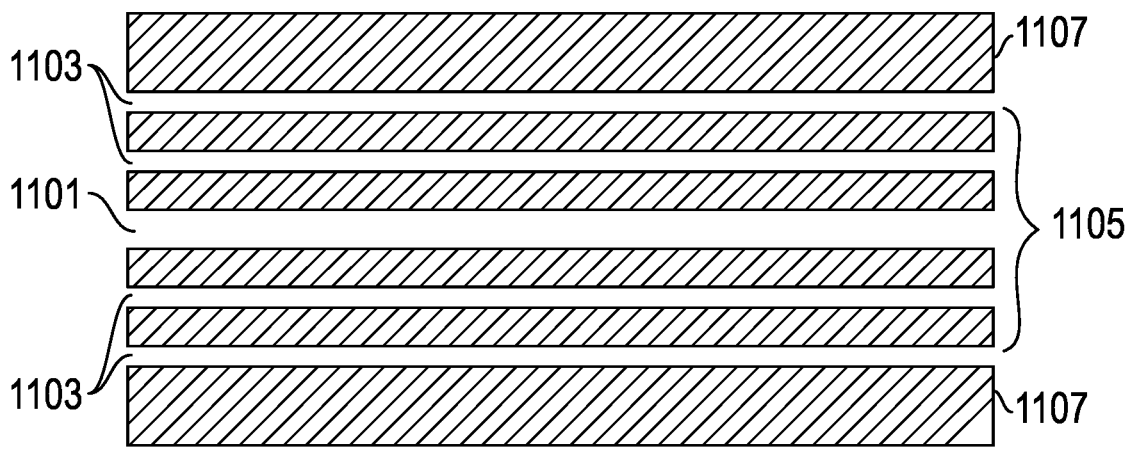
FIG. 11 is a schematic, sectional radial view of an embodiment of a PCB stator with PCB sections and air ducts of different axial thicknesses.

Alternatively, a combination of PCB sections and air ducts with varied axial thicknesses can be included. In FIG. 11, for example, a wide air duct 1101, narrow air ducts 1103, thin PCB sections 1105 and thicker PCB sections 1107 can be included. While FIGS. 9-11 provide examples of alternative embodiments, arrangements with other numbers of PCB sections and air ducts with different and varying axial thicknesses can be included.

Figure 12:
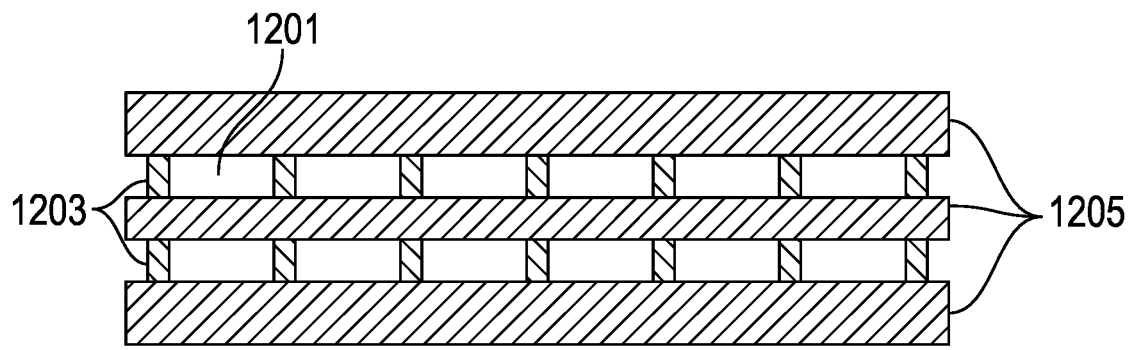
FIG. 12 is a schematic, sectional radial view of an embodiment of a PCB stator with spacers between PCB sections.

The air ducts inside the PCB stator can be formed in several ways. For example, as shown in FIG. 12, the air ducts 1201 can be formed by installing spacers 1203 between the PCB sections 1205. In this example, electrically non-conductive spacers can be bonded between two PCB sections. Embodiments of FIG. 12 can include non-conductive spacers with substantially rectangular and radially uniform cross sections. However, other spacer architectures and compositions can be used, such as trapezoidal, I-beam, C-channel, and others. It should be noted that the spacers can be made of materials such as epoxy-glass laminates, such as FR4 or equivalent, polyester-glass laminates, such as GPO-3 or equivalent, ABS, nylon or other plastic extrusions, with and without fillers, carbon composite extrusions, or other electrically non-conductive materials.

Figure 13:
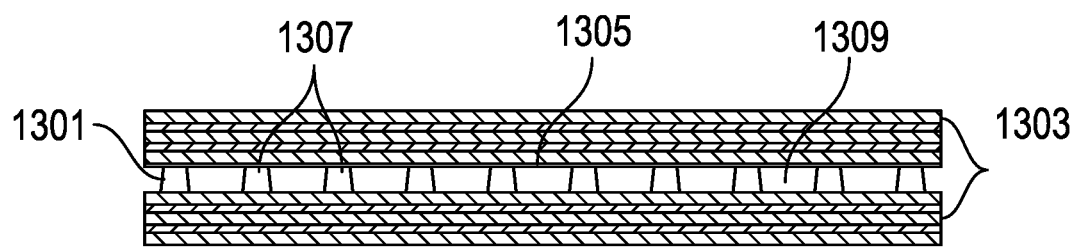
FIG. 13 is a schematic, sectional radial view of an embodiment of a PCB stator with metallic spacers etched on a PCB section.

Other embodiments can use metallic materials for duct spacers. FIG. 13 shows an example of an embodiment where an additional thick conductive (e.g., copper) layer is etched to form spacers 1301 that have approximately trapezoidal cross-sections due to the etching process. As an example, this copper layer can have a copper mass per unit area of about 14.3 oz/ft$^2$, which can result in spacers that are approximately 0.50 mm high. However, other spacer heights can be provided. In this embodiment, the surface of the adjacent PCB section 1303 can have a solder foil 1305 and the copper spacers 1301 can be soldered to the solder foil 1305 to form solder joints 1307 and attach the two axially adjacent PCB sections 1303 and define the air ducts 1309 between them.

Figure 14:
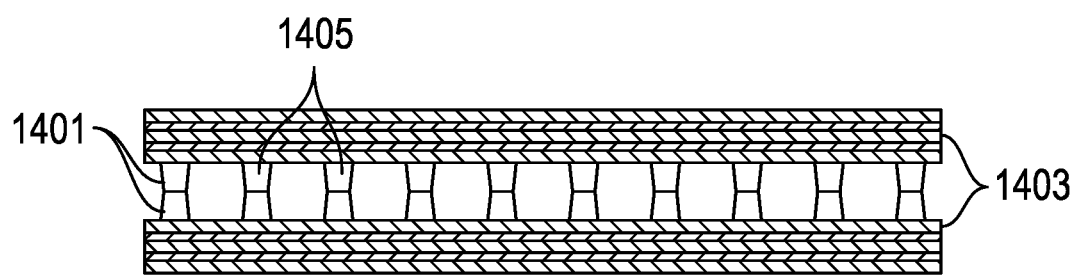
FIG. 14 is a schematic, sectional radial view of an embodiment of a PCB stator with metallic spacers etched on two adjacent PCB sections.

FIG. 14 shows another example of an embodiment where the spacers 1401 can be etched on the surfaces of two adjacent PCB sections 1403 and then soldered together at solder joints 1405. As an example, the spacers 1401 on both surfaces can be etched out of copper layers that can have a copper mass per unit area of about 14.3 oz/ft$^2$ resulting in a total spacer height of about 1.0 mm. However, other spacer heights can be provided. The spacers can be identical, or they can have different dimensions on different PCB sections 1403.

Figure 15A:
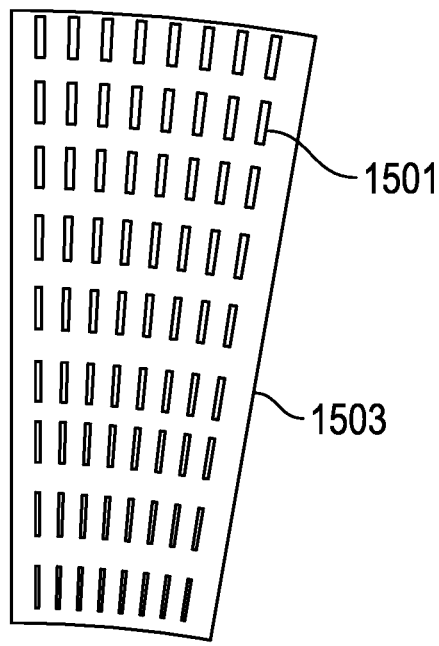
FIGS. 15A-C are schematic plan views of portions of other embodiments of a PCB stator with air ducts and metal spacers.
Figure 15B:
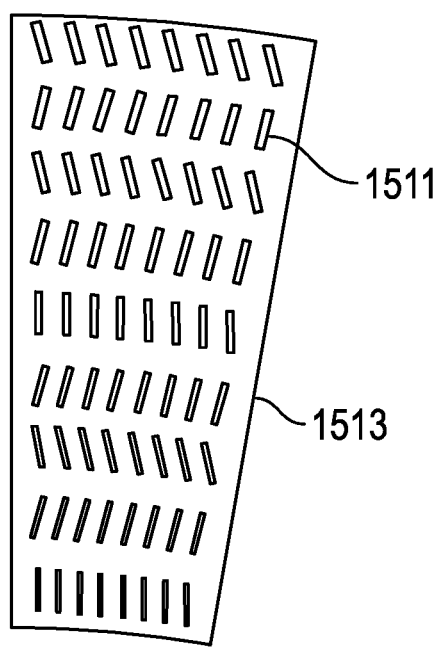

The use of metallic materials for duct spacers can have undesirable effects. For example, eddy current can be induced in the spacers. These eddy currents can generate losses and heat. To curb the eddy currents and mitigate the resulting losses, the metal spacers 1501 (FIG. 15A) of the PCB section 1503 can be segmented into smaller pieces. The embodiment shown in FIG. 15A can be formed by etching external conductive (e.g., copper) layers. It also can be achieved by bonding metal spacers to the surface of the PCB section. FIG. 15A shows spacer segments that are substantially rectangular and radially aligned. However, the spacers can be aligned in non-linear patterns, as shown in FIG. 15B, where spacers 1511 of PCB section 1513 in different circumferential rows are oriented at different angles.

Figure 15C:
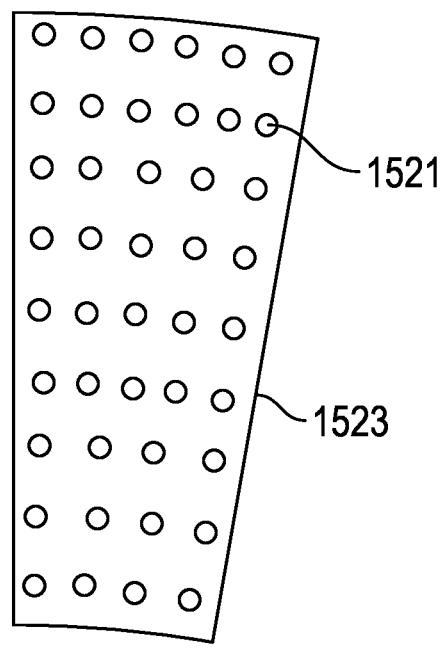

Furthermore, spacers 1521 (FIG. 15C) of PCB section 1523 can have other configurations such as substantially circular sections. FIG. 15C shows a spacer distribution pattern where there are more spacers per row (e.g., higher density) in the rows near the outer diameter of the PCB stator and fewer spacers (e.g., lower density) near the inner diameter. Other embodiments, such as the one shown in FIG. 15A, can have spacers with different profiles. For example, the spacers near the inner diameter of the PCB stator can be circumferentially thinner than the spacers near the outer diameter. Other spacer configurations also are possible, such as pin-fin, airfoil, and arcuate segments, or segments that are not radially aligned, such as offset fins, and other combinations of spacer shapes and spacer alignments.

Figure 16:
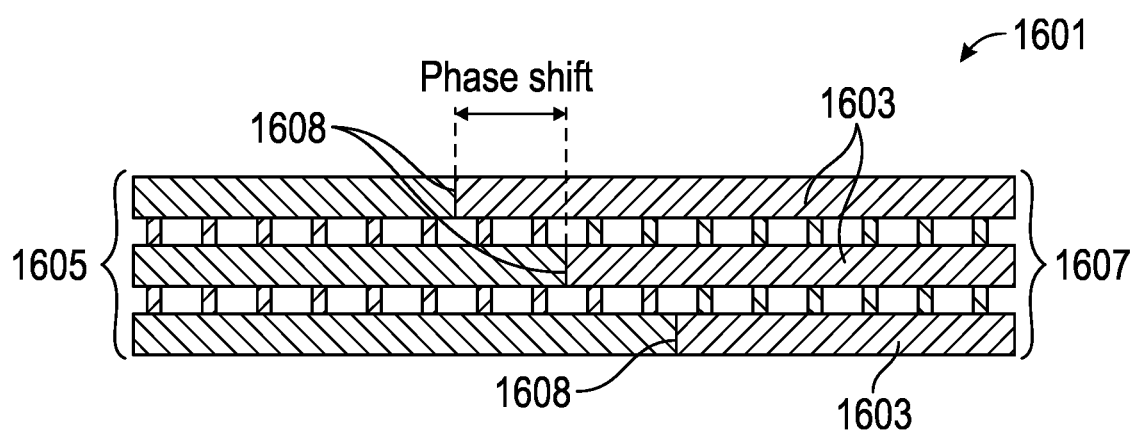
FIG. 16 is a schematic, sectional radial view of an embodiment of a segmented PCB stator depicting electrical phase shifts between PCB segments.

FIG. 16 shows a sectional side view of an example of a segmented PCB stator 1601 with three PCB sections 1603. Each PCB section 1603 can be assigned to an electrical phase. The interface between two circumferentially adjacent segment sections 1605, 1607 can each have corresponding PCB sections that are angularly shifted 360/3=120 electrical degrees. An interface 1608 can be defined between two circumferentially adjacent (e.g., abutting) segment sections 1605, 1607. Other embodiments can have a different number of PCB sections in each segment as depicted in FIGS. 10 and 11, or can have a different number of electrical phases, or any combination of sections and phases.

To demonstrate the validity of this approach, Computational Fluid Dynamics (CFD) simulations were performed on a simulated PCB stator with and without embedded cooling channels. The results are shown in FIG. 17 and indicate that including air ducts in the PCB stator can reduce the pressure drop, pumping power and thermal resistance, simultaneously, thereby providing a significant boost to cooling performance.

Figure 17A:
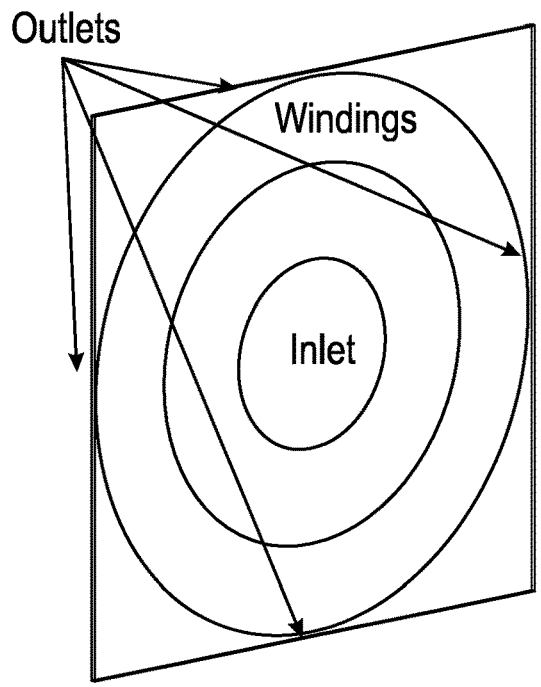
FIG. 17A is a schematic image of an embodiment of a PCB stator for computational fluid dynamics simulations.
Figure 17B:
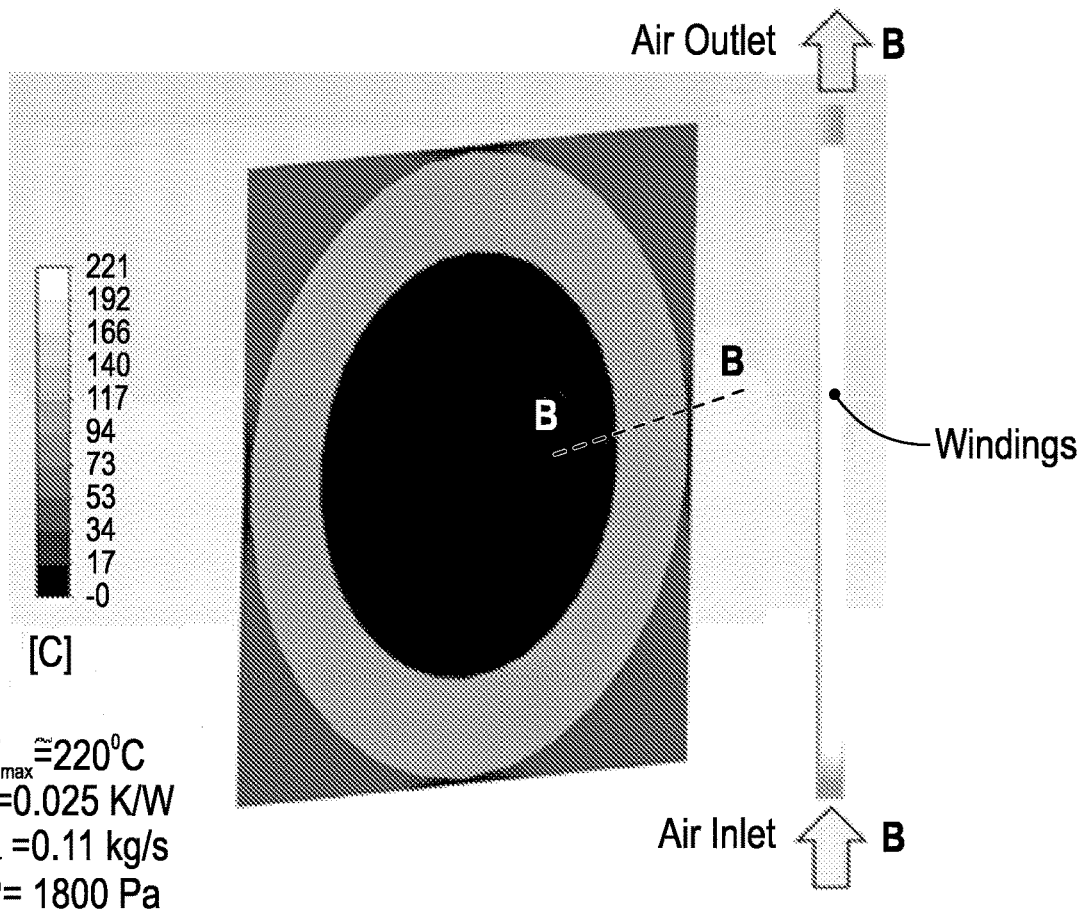
FIGS. 17B and 17C are the computer-simulated results of respective variations of the PCB stator of FIG. 17A.
Figure 17C:
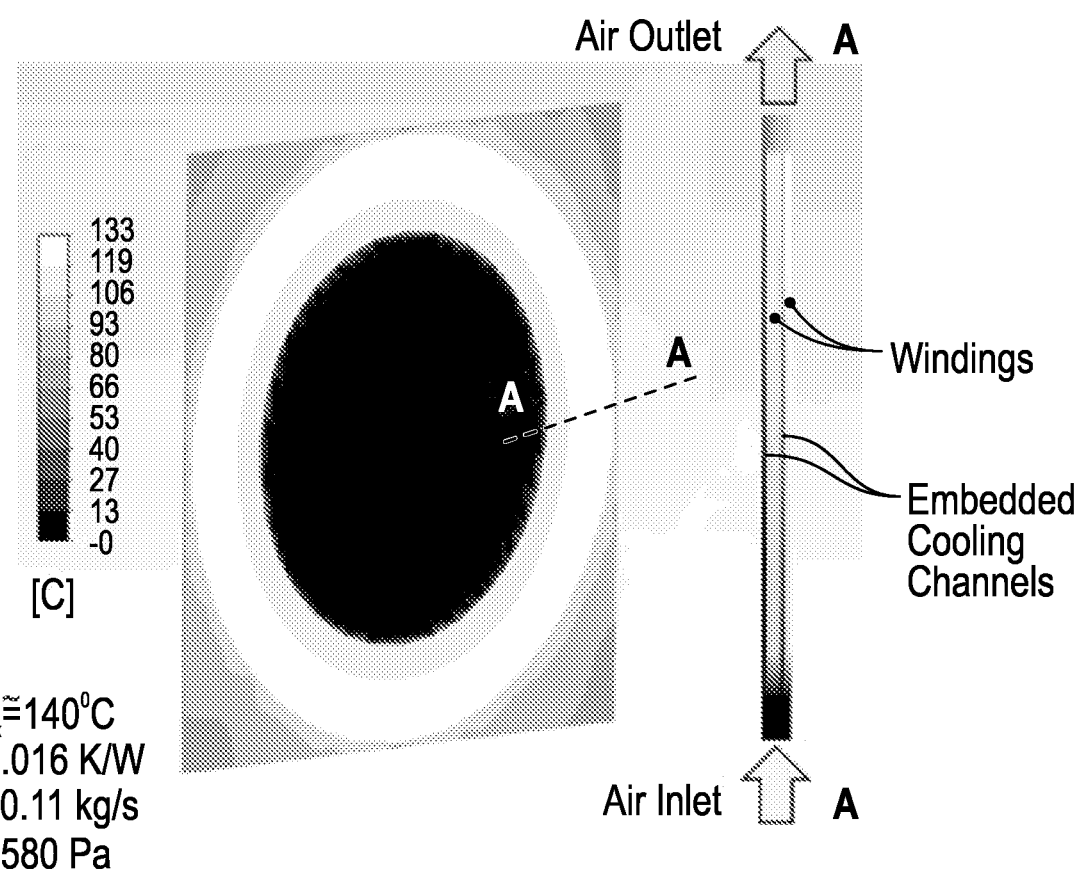

FIG. 17 depicts embodiments of PCB stator simulation results. FIG. 17A is a schematic image of an embodiment of a PCB stator for computational fluid dynamics simulations. FIG. 17B illustrates a version that does not have cooling channels, and FIG. 17C illustrates a version that does have cooling channels. The embedded cooling in the PCB stator reduces the junction to ambient thermal resistance between the heat sources and the heat sinks by increasing heat transfer surface area and reducing the heat transfer path. FIG. 17C shows that adding the embedded air cooling channels in the PCB reduces the thermal resistance from 0.025 K/W to 0.016 K/W, which results in a reduction of the maximum temperature difference between the hot spots and the cooling air. Moreover, adding the cooling channels to the PCB stator reduces the pressure drop and increases the coefficient of performance (COP), which is defined as the ratio of the dissipated heat and the required pumping power.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

What is claimed is:

1. An axial field rotary energy device, comprising:
   a housing;
   a rotor rotatably coupled to the housing, and the rotor comprises an axis of rotation and magnets; and
   a stator assembly coupled to the housing coaxial with and adjacent to the rotor, the stator assembly comprises printed circuit boards (PCBs) each having a plurality of layers, each layer having a plurality of electrically conductive coils and an internal air duct for cooling the stator assembly, wherein the internal air duct is interleaved between adjacent ones of the PCBs such that the internal air duct is separated and spaced apart from the electrically conductive coils.

2. The device of claim 1, wherein the stator assembly comprises an axial stack of PCBs that are coupled together.

3. The device of claim 2, wherein the stator assembly comprises a single, monolithic PCB structure having the PCB layers that function as respective PCB sections.

4. The device of claim 1, wherein the internal air duct comprises a plurality of internal air ducts, and each internal air duct is located axially between two adjacent PCBs.

5. The device of claim 1, further comprising a fan coupled to the rotor, the fan is configured to produce radial air flow, relative to the axis, through the internal air duct.

6. The device of claim 5, wherein the radial air flow is configured to comprise:
   a first airflow that flows radially through an air gap between the magnets and the stator assembly before exiting at an outer periphery of the rotor; and
   a second airflow that flows radially through the internal air duct before exiting at an outer edge of the stator assembly.

7. The device of claim 1, wherein the internal air duct comprises a radial array of internal air ducts that extend from an inner diameter of the PCBs to an outer diameter of the PCBs.

8. The device of claim 1, wherein the stator assembly comprises a plurality of semi-circular PCB segments that are coupled together to form the stator assembly.

9. The device of claim 8, wherein each PCB segment is configured to comprise a separate electrical phase, and the PCB segments are circumferentially shifted relative to each other angularly by 360/n electrical degrees, where n is the number of electrical phases.

10. The device of claim 1, further comprising spacers located in the internal air duct.

11. The device of claim 10, wherein the spacers are electrically non-conductive and bonded between two PCB sections of one of the PCBs.

12. The device of claim 10, wherein the spacers comprise substantially rectangular shapes and radially uniform cross-sections.

13. The device of claim 10, wherein the spacers are electrically conductive and etched from an electrically conductive layer of material to form the internal air duct.

14. The device of claim 13, wherein the spacers comprise a trapezoidal cross-sectional shape.

15. The device of claim 10, wherein a PCB section of one of the PCBs further comprises a solder foil and the spacers are soldered to the solder foil to form solder joints and attach two axially adjacent PCB sections of said one of the PCBs to define the internal air duct between them.

16. The device of claim 10, wherein the spacers are etched on the surfaces of two adjacent PCB sections of one of the PCBs and soldered together at solder joints.

17. The device of claim 10, wherein the spacers are substantially rectangular in shape and radially aligned.

18. The device of claim 10, wherein the spacers comprises non-linear patterns.

19. The device of claim 10, wherein the spacers are cylindrical in shape.

20. The device of claim 10, wherein the spacers comprise a spacer distribution pattern having a higher density of spacers adjacent an outer diameter of the PCBs, and a lower density of spacers adjacent an inner diameter of the PCBs.

21. The device of claim 10, wherein the spacers adjacent to an inner diameter of the PCBs stator are circumferentially thinner than the spacers adjacent to an outer diameter of the PCBs.

22. The device of claim 1, wherein the PCBs comprise segmented PCB stators having PCB segments, each PCB segment comprises PCB sections, each PCB section is assigned to an electrical phase, and the PCB sections are angularly shifted.

23. The device of claim 1, wherein the stator assembly comprises a plurality of PCB sections and a plurality of internal air ducts.

24. The device of claim 23, wherein each PCB section comprises a same axial thickness, and each internal air duct comprises a same axial thickness.

25. The device of claim 23, wherein at least one of the PCB stator sections differs in axial thickness from the others.

26. The device of claim 23, wherein at least one of the internal air ducts differs in axial thickness from the others.

* * * * *